US011060582B2

(12) United States Patent
Hung (10) Patent No.: US 11,060,582 B2
(45) Date of Patent: Jul. 13, 2021

(54) ELECTRIC ADJUSTABLE MAGNETIC CONTROL DAMPER

(71) Applicant: CHI HUA FITNESS CO., LTD., Hsinchu County (TW)

(72) Inventor: Chien-Hsiung Hung, Hsinchu County (TW)

(73) Assignee: Chi Hua Fitness Co., Ltd., Hsinchu County (TW)

( * ) Notice: Subject to any disclaimer, the term of this patent is extended or adjusted under 35 U.S.C. 154(b) by 142 days.

(21) Appl. No.: 16/564,367

(22) Filed: Sep. 9, 2019

(65) Prior Publication Data

US 2021/0071731 A1 Mar. 11, 2021

(51) Int. Cl.
| F16F 7/02 | (2006.01) |
| F16H 1/20 | (2006.01) |
| F16H 25/24 | (2006.01) |
| A63B 21/008 | (2006.01) |
| A63B 21/005 | (2006.01) |
| H02K 7/116 | (2006.01) |
| F16H 25/20 | (2006.01) |

(52) U.S. Cl.
CPC ............ *F16F 7/023* (2013.01); *A63B 21/008* (2013.01); *A63B 21/0052* (2013.01); *F16H 1/20* (2013.01); *F16H 25/2454* (2013.01); *F16H 2025/204* (2013.01); *F16H 2025/2028* (2013.01); *H02K 7/116* (2013.01)

(58) Field of Classification Search
CPC .... F16F 7/023; A63B 21/0052; A63B 21/008; F16H 1/20; F16H 25/2454; F16H 2025/2028; F16H 2025/204; H02K 7/116
See application file for complete search history.

(56) References Cited

U.S. PATENT DOCUMENTS

| 5,542,507 | A | * | 8/1996 | Warchocki | F16D 57/00 188/276 |
| 2002/0049112 | A1 | * | 4/2002 | Kusumoto | H02K 7/10 475/318 |
| 2006/0250043 | A1 | * | 11/2006 | Chung | H02K 5/08 310/216.004 |
| 2007/0029893 | A1 | * | 2/2007 | Schuler | H02K 7/116 310/239 |
| 2007/0060433 | A1 | * | 3/2007 | Schuler | F16H 13/06 475/10 |

(Continued)

*Primary Examiner* — Zakaria Elahmadi
(74) *Attorney, Agent, or Firm* — Rosenberg, Klein & Lee (57) ABSTRACT

An electric adjustable magnetic control damper comprises a force applied unit, a magnetic control unit, a driving unit, and a control unit; a driving rod drives the force applied unit displaced linearly, and a screw sleeve for the screw sleeve to displace linearly and for the screw rod and the magnetic ring to be rotatable, the magnetic control unit has a fixing seat able to displace linearly, and the fixing seat has a the permanent magnet, the driving unit has a motor and a gear train, the control unit can input the required damper value to drives the motor to rotate; whereby the motor and the gear train drives the fixing seat displaced, and create a required gap between the permanent magnet of the fixing seat and the rotor of the magnetic ring to create eddy load for being dampers of axial displacement of the driving rod and rotation of the rotor, and the damper achieves the effect of fitness exercise.

6 Claims, 11 Drawing Sheets

(56) References Cited

U.S. PATENT DOCUMENTS

| | | | | |
|---|---|---|---|---|
| 2009/0107779 A1* | 4/2009 | Azekatsu | ................ | F16F 9/535 |
| | | | | 188/267.2 |
| 2009/0260463 A1* | 10/2009 | Fukano | ............... | F16H 57/0497 |
| | | | | 74/89.33 |
| 2012/0085606 A1* | 4/2012 | Walthert | ............... | H01F 7/0226 |
| | | | | 188/267.2 |
| 2014/0298980 A1* | 10/2014 | Cyren | ..................... | F16H 25/20 |
| | | | | 91/41 |
| 2015/0266542 A1* | 9/2015 | Marioni | ................ | H02K 21/02 |
| | | | | 180/62 |
| 2018/0215342 A1* | 8/2018 | Battlogg | ................ | F16F 15/18 |
| 2018/0259050 A1* | 9/2018 | Gnebner | ................ | F16H 48/34 |
| 2020/0173574 A1* | 6/2020 | Chorghe | .............. | H02K 7/06 |
| 2020/0195087 A1* | 6/2020 | Burkhardt | .............. | H02K 7/083 |

* cited by examiner

ELECTRIC ADJUSTABLE MAGNETIC CONTROL DAMPER

BACKGROUND OF THE INVENTION

1. Field of the Invention

The invention relates to a damper, especially to one that creates a required gap between the permanent magnet and the magnetic ring and produce eddy load to form a damper, then provides an electric adjustable magnetic control damper.

2. Description of the Related Art

In indoor sports or rehabilitation equipment, some actuating mechanism such as rowing fitness and strength training machines must have damping device. Due to the limitation of space, the damping device is mostly a hydraulic cylinder in application to indoor sports equipment. Such a hydraulic cylinder generally includes a cylinder, a piston being installed in the cylinder and having a passage arranged thereon and a piston rod at an end thereof. When the piston rod displaces linearly in the cylinder subject to an axial force, the hydraulic oil would pass through the passage on the piston to produce the damping effect.

Figure 1A:
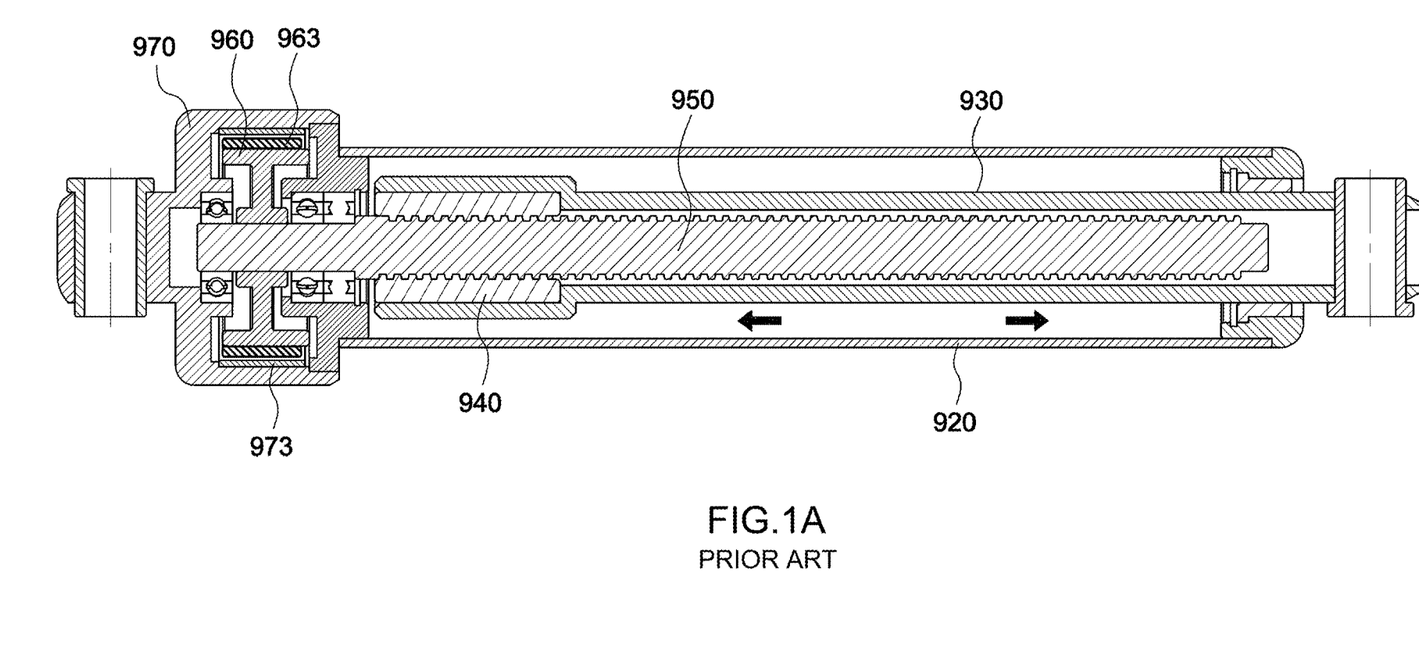
FIG. 1A is a schematic diagram illustrating the sectional view of the prior art.

A non-hydraulic damper gaining magnetic reluctance from circular motion converted from linear displacement. Referring to FIG. 1A, the main features of the invention is that a driving rod 930 is linearly displacing in a tube body 920, rotating a fixed seat 960 by having a screw sleeve 940 driving a screw rod 950 for rotation; then a plurality of permanent magnets 963 arranged on the fixed seat 960 would be operated in circle rotation, forming a torque by an eddy current produced between the permanent magnets 963 and a magnetic surface 973 of a cover 970, so as to provide a buffer and damping force. The subject invention has avoided problems of oil leakage and unstable damping effect, but the eddy current produced between the permanent magnets 963 and the magnetic surface 973 is unchanging; in other words, the device can only provide a certain degree of the torque. However, for users of fitness equipment, an unchanging degree of damping force cannot meet the need of fitness training since the different degree of the damping force is needed in the different stages of the training.

Figure 1B:
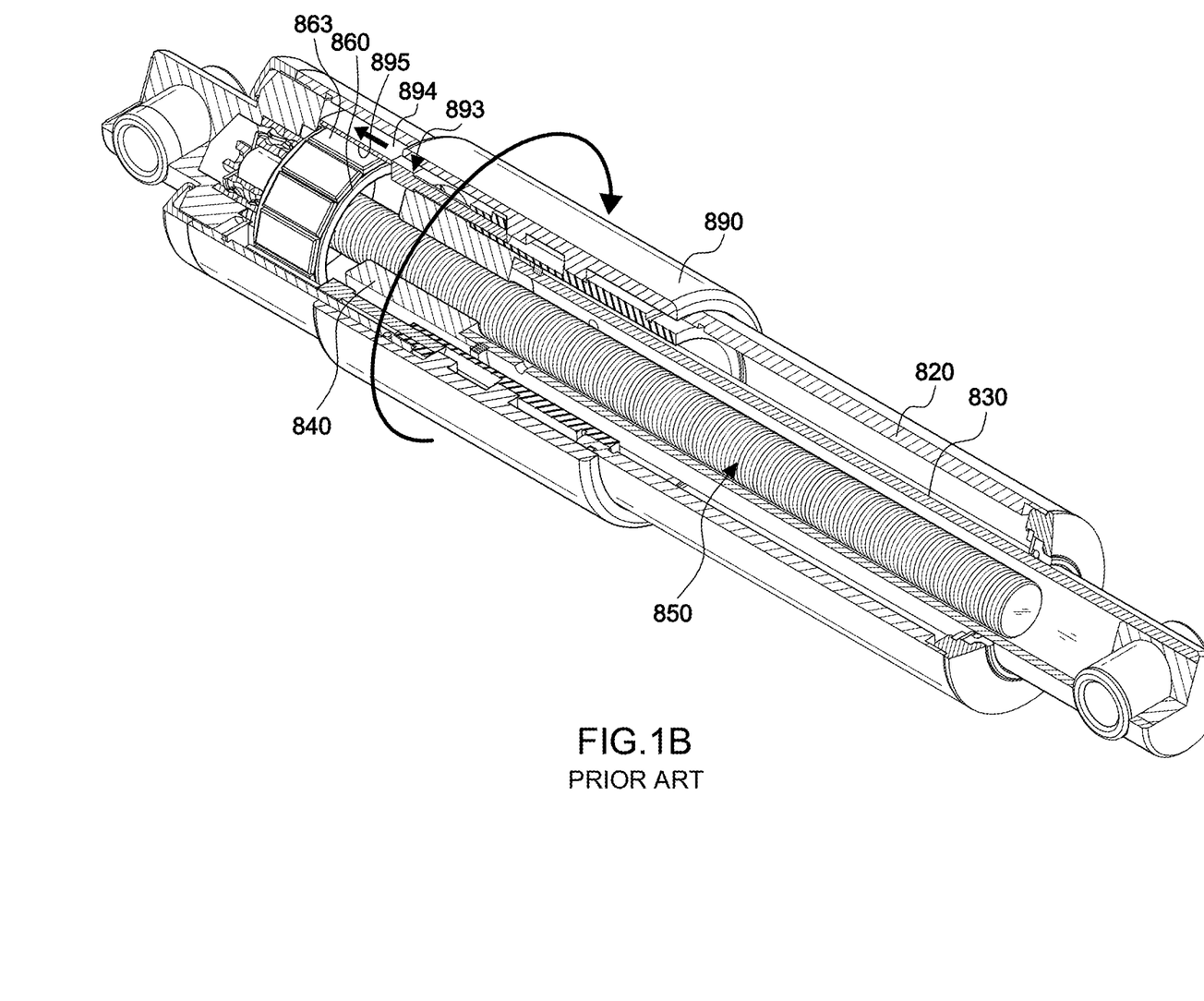
FIG. 1B is a schematic diagram illustrating the sectional view of another prior art.

An adjustable damper illustrated in FIG. 1B, U.S. Pat. No. 9,404,584 B2, includes a tube body 820, a driving rod 830 to be displaced in the tube body 820 and to engage a screw sleeve 840 to drive a screw rod 850 and further a fixed seat 860 for rotation. The fixed seat 860 has a plurality of permanent magnets 830 surrounding for circular rotation and an operation element 893 is drove by a rotating element 890 for repeated linear displacement; a magnetic surface 895 is further arranged on an inner periphery of an annular element 894 of the operation element 893 and an annular gap is arranged between the magnetic surface 895 and the permanent magnets 863; therefore the displacing annular element 894 is able to adjust a damping force of the driving rod 830 by adjusting an overlapped area of the permanent magnets 863 and a magnetic surface 895, and further adjust the eddy load formed thereby.

The adjustable damper above mentioned can adjust the damper based on user's requirement, but there is no feedback mechanism and no graduation setting on the rotating element 890, the user can only adjust the damper manually by feeling. Since manual adjustment cannot precisely control the damper value, it is not acceptable to the user.

SUMMARY OF THE INVENTION

It is a primary objective of the present invention to provide an electric adjustable magnetic control damper that has a motor driving fixing seat to displace linearly to change the eddy load produced by the force applied unit and magnetic control unit and further achieve adjusting the damper value.

It is another objective of the present invention to provide a control unit controlling the setting of the damper value and driving the motor to change the eddy load produced by the gap between the force applied unit and the magnetic control unit, and achieve providing the electric adjustable magnetic control damper that can precisely adjust the damper value.

In order to achieve the above objectives, the electric adjustable magnetic control damper includes a force applied unit, a magnetic control unit, a driving unit, and a control unit; wherein the force applied unit having a tube body with a driving rod engaged in the first axial passage, a screw sleeve engaging the driving rod, a screw rod engaging the screw sleeve and the screw sleeve for the screw sleeve to displace linearly and for the screw rod to be rotatable, a rotor mounted on the screw rod and surrounded by a magnetic ring; the magnetic control unit having a fixing seat, and a circular permanent magnet arranged close to the side of the magnetic ring forms a gap between them to create eddy load; a shaft hole of the fixing seat arranged at the outer periphery of a nut, the nut is screwed with a rotation shaft, a driven gear connected to the end of the rotation shaft, the driven gear drives the rotation shaft rotated then the nut force the fixing seat displace linearly; the driving unit having a motor and gear train connected with the motor, the driven gear of the magnetic control unit engaging the gear train, and the motor drives the rotation shaft of the magnetic control unit to rotate; the control unit having an input interface and a controller able driving motor to rotate.

Whereby the driving rod displaces linearly in the first passage when the force applied unit is subject to an axial force, the screw sleeve driving the screw rod to rotate and further driving the rotor and the magnetic ring operating a circular rotation motion; and the input interface set a damper value, the control unit drives the motor of the driving unit by the damper value been set, by the connection with the driven gear the gear train drives the rotor to rotate and make the magnetic control unit displaces linearly, then produce a required gap between the permanent magnet and the magnetic ring, and the eddy load produced by the gap becomes the damper to the axial force applied to the force applied unit.

Furthermore, the control unit having a variable resistor, the variable resistor having an input shaft connected to the gear train, the input shaft driven by the motor to rotate and transmits feedback signal of the displacement back to the controller.

Also, the permanent magnets are composed of a plurality of rubidium magnets.

Also, the first pivot portion is composed of an oil-bearing or a tube, and the second pivot portion is composed of an oil-bearing or a tube.

As state above, the electric adjustable magnetic control damper of the present invention having effects below:

a) The linear displacement of the driving rod drives the rotor and the magnetic ring operating a circular rotation motion, and the motor drives the fixing seat displaced linearly, then produces a gap between the permanent magnet and the magnetic ring, and the eddy load produced by the gap becomes the damper to the rotor and the driving rod during linear displacement; a magnetic resistance from the eddy load produced between the permanent magnets and the magnetic surface, solving the problem of oil leakage and the problem of slow reaction in a conventional hydraulic cylinder; also, the present invention using the motor to drive the fixing seat to displace, the user does not need to adjust the damper manually, so having the benefits of automation and strength saving.

b) The control unit of the present invention including an input interface for user to set a damper value in required, a variable resistor driven by a motor able to transmit feedback signal of displacement, a controller received feedback signal, then the motor drives the fixing seat displaced, producing a required gap between the permanent magnet and the magnetic ring, and the eddy load produced by the gap becomes the damper to the axial force applied to the force applied unit, the present invention adjusts the required gap by the control unit controlling the displacement of the fixing seat, then achieve the effect of precisely control the damper value.

DETAILED DESCRIPTION OF THE PREFERRED EMBODIMENT

Figure 2:
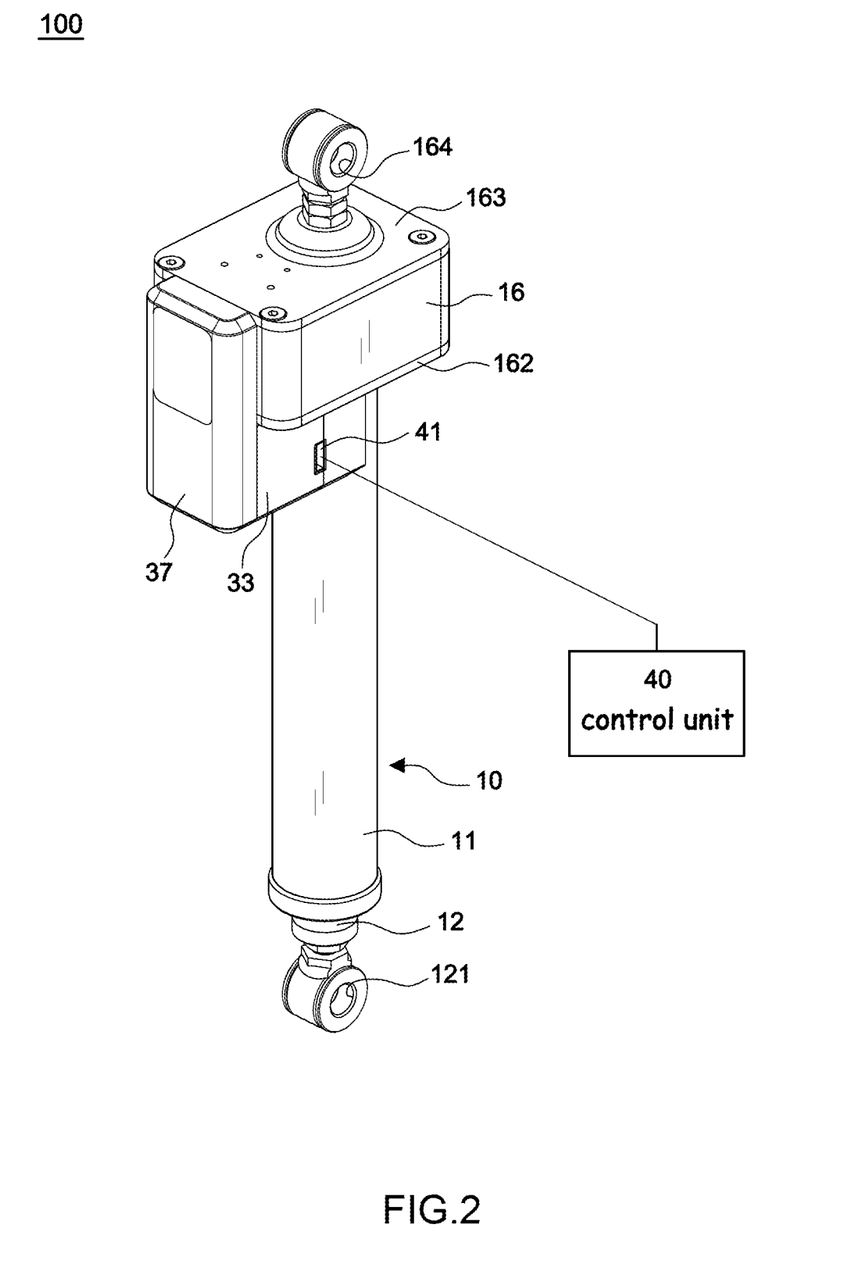
FIG. 2 is an assembly perspective views of the present invention.
Figure 3:
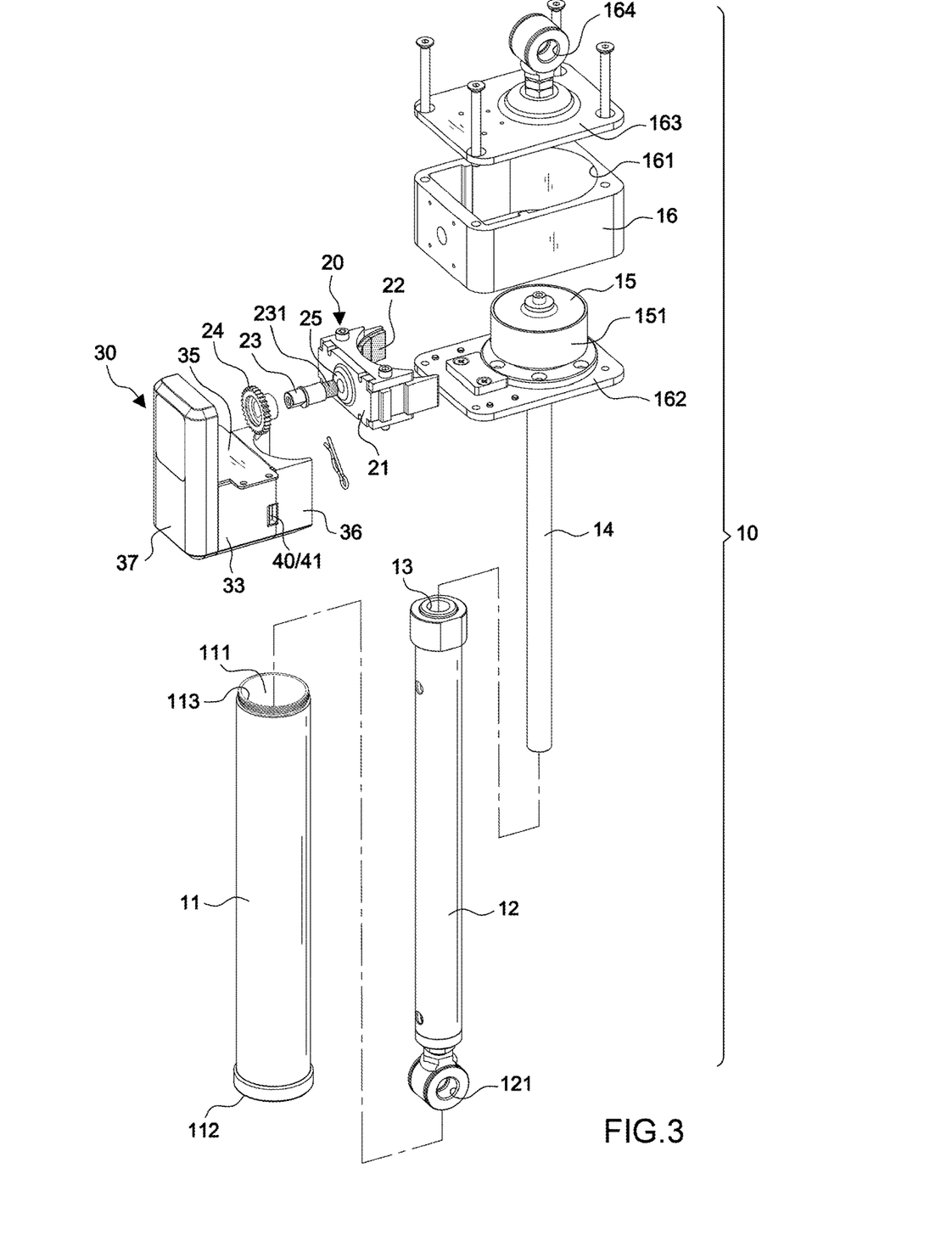
FIG. 3 is an exploded perspective views of the present invention.
Figure 4A:
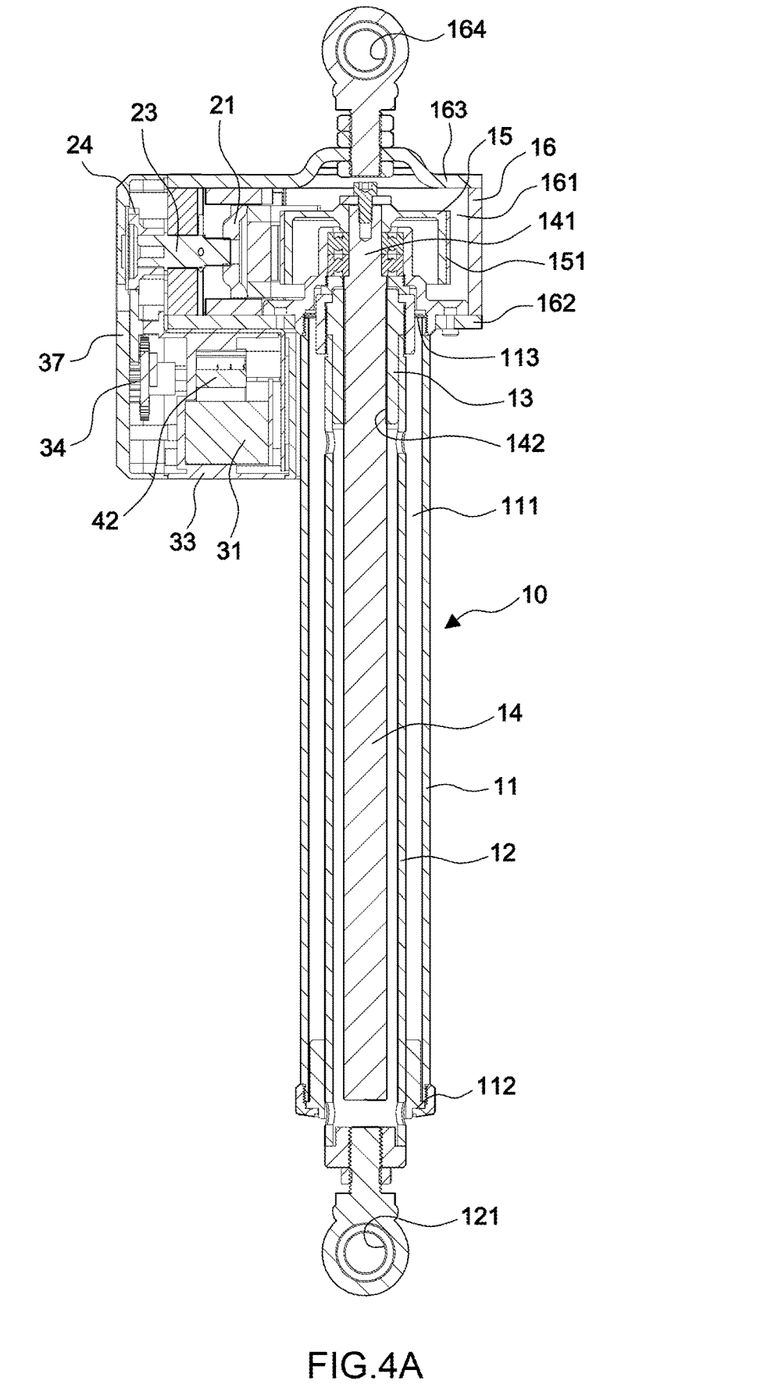
FIG. 4A is an assembly sectional views of the present invention.

Referring to FIGS. 2-3 and FIG. 4A, the electric adjustable magnetic control damper 100 in the present invention, comprising: a force applied unit 10 having a tube body 11, at the inner periphery of the tube body 11 having a first axial passage 111 and having a first through hole 112 at the end and a second through hole 113 at the other end; a driving rod 12 set through the first axial passage 111 and extended through out of the first through hole 112, the driving rod 12 having a first pivot portion 121 at the end; the first pivot portion 121 is composed of an oil-bearing or a tube; a screw sleeve 13 engaging the inner end of the driving rod 12 for linear displacement in the first axial passage 111; a screw rod 14 including a shaft section 141 and a thread section 142 to be screwed with the screw sleeve 13, and the screw sleeve 13 for the screw sleeve 13 to displace linearly and for the screw rod 14 to be rotatable; a rotor 15 arranged at the shaft section 141 having a magnetic ring 151 at the outer periphery, the magnetic ring is composed of a ring formed magnetic component fixed at the periphery of the rotor; a first case 16 having a first container 161 for placing the rotor 15, a bottom lid 162 for fixing the second through hole 113 of the tube body 11, and a top lid 163 for connecting a second pivot portion 164, the second pivot portion 164 is composed of an oil-bearing or a tube; above mentioned the force applied unit 10 having the first pivot portion 121 and the second pivot portion 164 connected to the force applied rod and the fixing portion separately, does not show in drawings, the driving rod 12 displaces linearly when the user apply force to the force applied rod, then the rotor 15 of the force applied unit 10 is drove to rotate.

Figure 4B:
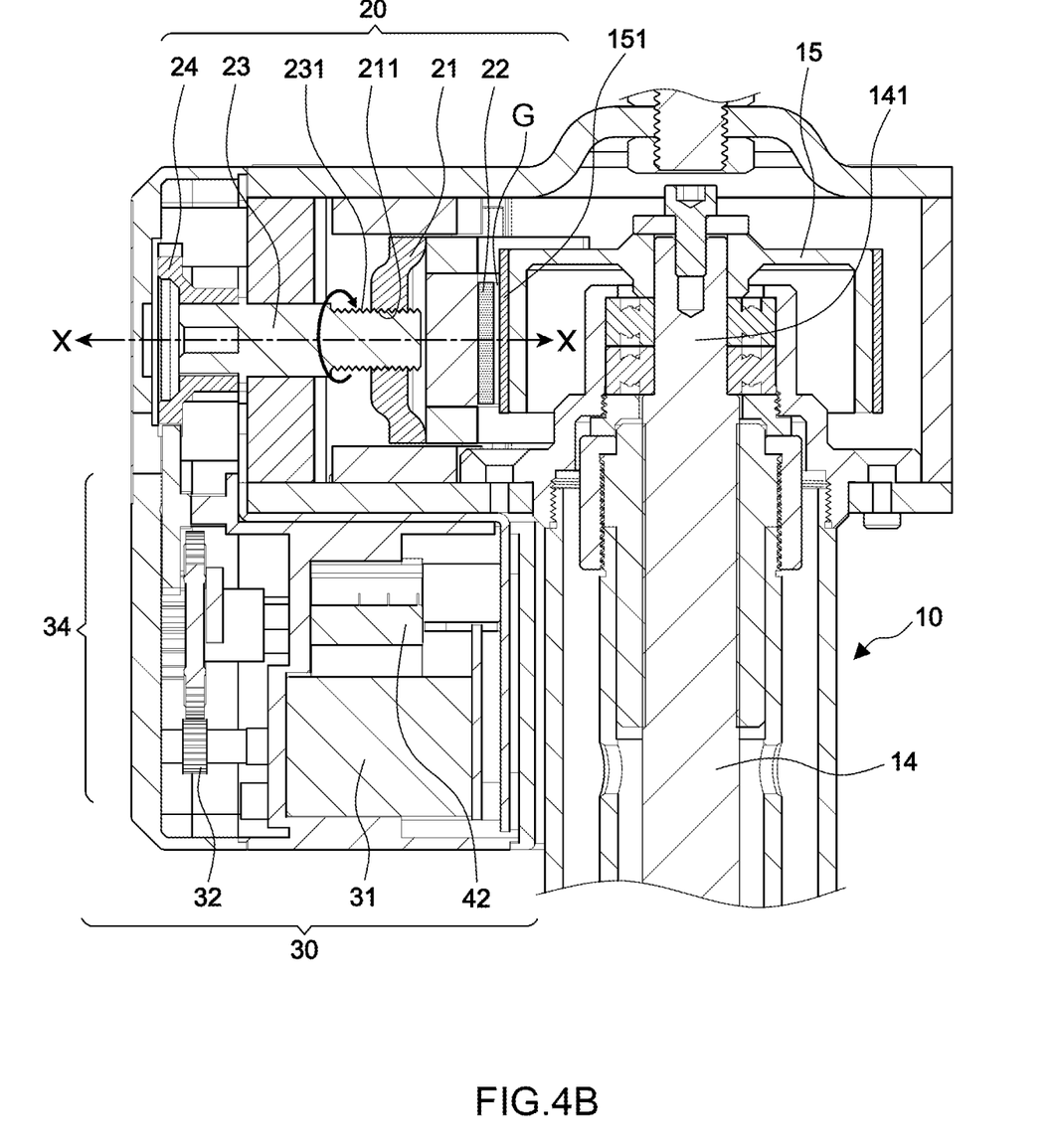
FIG. 4B is an assembly sectional views of the partial present invention.

Referring to FIG. 4B, a magnetic control unit 20 having a fixing seat 21 arranged inside the first container 161, inside the first container 161 having a circular permanent magnet 22 arranged near to the rotor 15 and the magnetic ring 151 to form a gap G between the circular permanent magnet 22 and the magnetic ring 151 to create eddy load; the load is an eddy-current resistance formed by the magnetic field variation for providing the required damper of fitness sport; the fundamental principle is using a back electromotive force, eddy current, formed in the local closing circuit when placing the conductor into the changing magnetic flux, the eddy current direction must be opposite to the magnetic flux changing direction; based on Maxwell's equation knows the magnitude of the magnetic force is proportional to the square of the magnetic flux density, and the magnetic force can be the damper required in exercise equipment. Moreover, the permanent magnets 22 of the magnetic control unit 20 are composed of a plurality of rubidium magnets, the fixing seat 21 with a shaft hole 211 arranged at the outer periphery of a nut 25, a rotation shaft 23 having a thread section 231 screwed with the nut 25, the rotation shaft 23 extended through out of the first case 16 and connected to a driven gear 24, the driven gear 24 drives the rotation shaft 23 to rotate, and the nut 25 force the fixing seat 21 to displace linearly on X-X axial; since the driven gear 24 can be controlled rotate direction and adjust the number of rotations, thus the displacement direction and distance of the fixing seat 21 can also be controlled; in other words, in the present invention, the rotation of the driven gear 24 make the fixing seat 21 displacing, and form a required gap G between the permanent magnets 22 and the magnetic ring 151 to create eddy load for providing required damper for fitness exercise.

Figure 5:
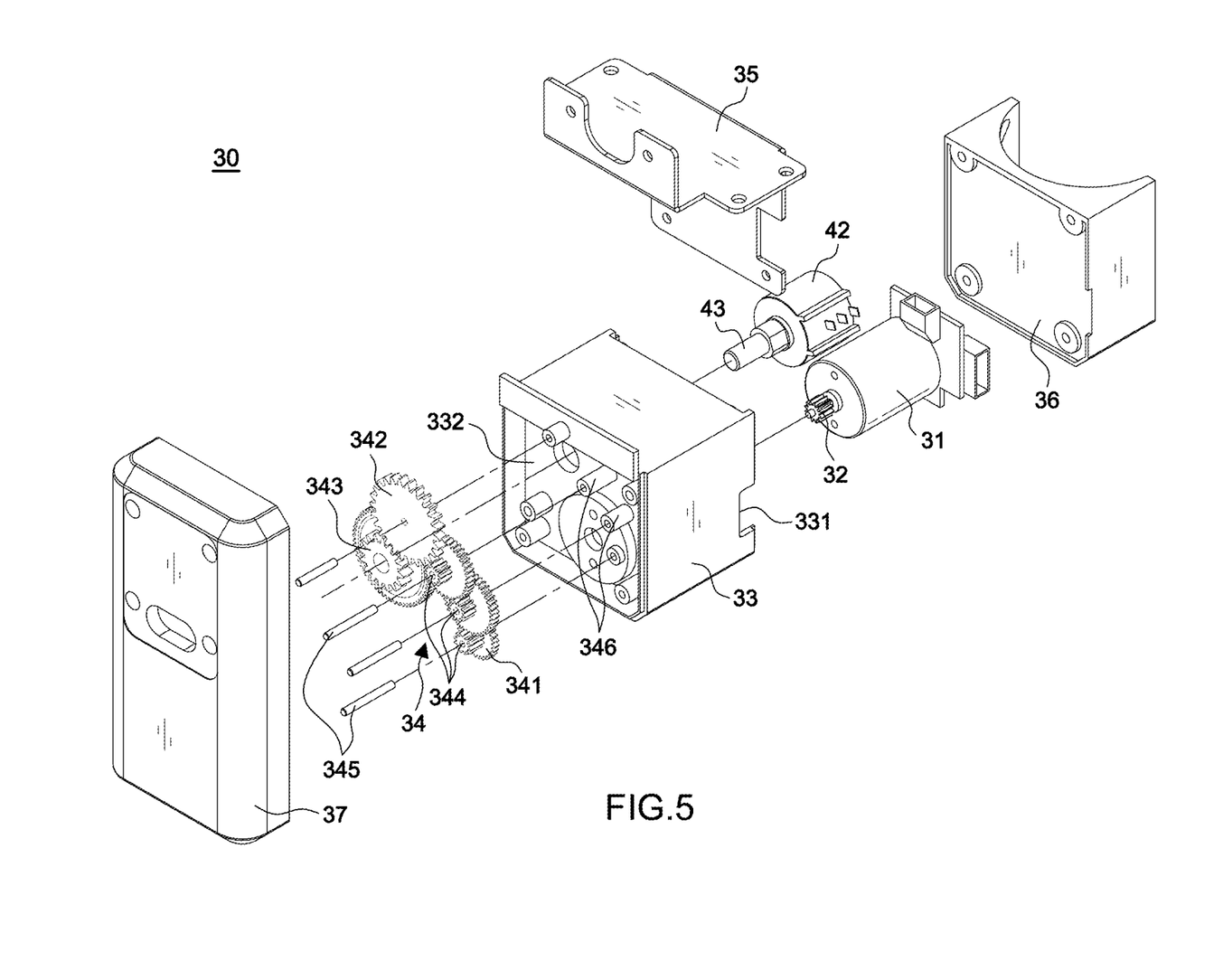
FIG. 5 is an exploded perspective views of the driving unit in the present invention.
Figure 6:
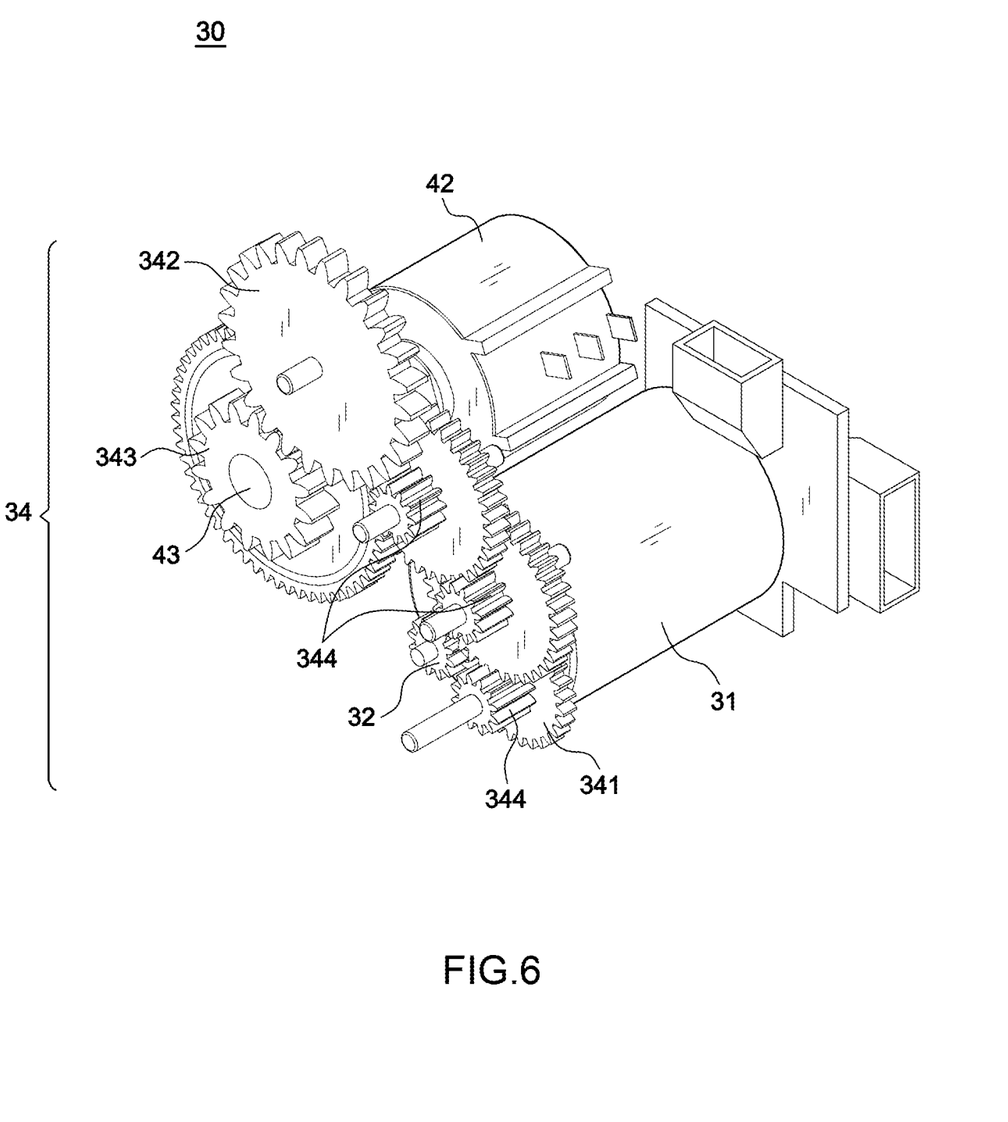
FIG. 6 is a schematic diagram illustrating the arrangement of the gear train of the driving unit in the present invention.

Referring FIGS. 5-6, a driving unit 30 having a motor 31 connected with a driving gear 32; a second case 33 having a second container 331 for placing the motor 31, a gear chamber 332 for installing the gear train 34 for transmission and deceleration, a top board 35 for fixing he first case 16, an inner board 36 for covering the second container 331 and protecting the motor 31, an outer board 37 for covering the gear chamber 332 and protecting the gear train 34; the gear train 34 including a first transmitting gear 341, a second transmitting gear 342, a third transmitting gear 343 and multiple intermediate gear 344, using multiple gear shaft 345 set through the seating 346 to make it rotate; the driving gear 32 engaging the first transmitting gear 341 in the gear chamber 332, thus through the connection between multiple intermediate gear 344 of the gear train 34, the rotation speed of the motor 31 is decreased and the first transmitting gear 341 transmits to the second transmitting gear 342 and the third transmitting gear 343, and the driven gear 24 of the magnetic control unit 20 engaging the second transmitting gear 342, so the rotation shaft 23 of the magnetic control unit 20 can be drove by the motor 31 to rotate.

Referring to FIG. 2 and FIG. 5, a control unit 40 having a input interface allows user to set required damper value, which is mounted on the side of the second case 33; a variable resistor 42 arranged inside the second container 331, the variable resistor having an input shaft 43 connected to the third transmitting gear 343 in the gear chamber 332, so the input shaft 43 driven by the motor 31 to rotate; a controller, not showing in drawing, electrically connected to the motor 31 and the variable resistor 42, so the controller can using required damper value been set to drive the motor 31, and received the feedback signal of displacement from the variable resistor 42 to adjust the rotation of the motor 31.

Whereby when the user operating fitness equipment, the driving rod 12 displaces linearly in the first passage 111 driving the screw sleeve 13 to rotate the screw rod 14 and further driving the rotor 15 and the magnetic ring 151 operating a circular rotation motion; and the user uses the control unit 40 to drive the motor 31 of the driving unit 30 by the damper value been set, the second transmitting gear 342 engaging the driven gear 24 of the gear train 34 drives the rotation shaft 23 to rotate and make the fixing seat 21 of the magnetic control unit 20 displaces linearly; the variable resistor 42 having an input shaft 43 connected to the third transmitting gear 343, the input shaft 43 driven by the motor 31 to rotate and the variable resistor 42 transmits signal of the displacement back to the controller for adjusting the rotation of the motor 31, the fixing seat 21 of the magnetic control unit 20 further displace by the feedback signal of the variable resistor 42, and achieve forming required gap between the permanent magnet 22 and the magnetic ring 151, then the eddy load produced by gap become damper to linear displacement of the rotor 15 and the driving rod 12.

Figure 7:
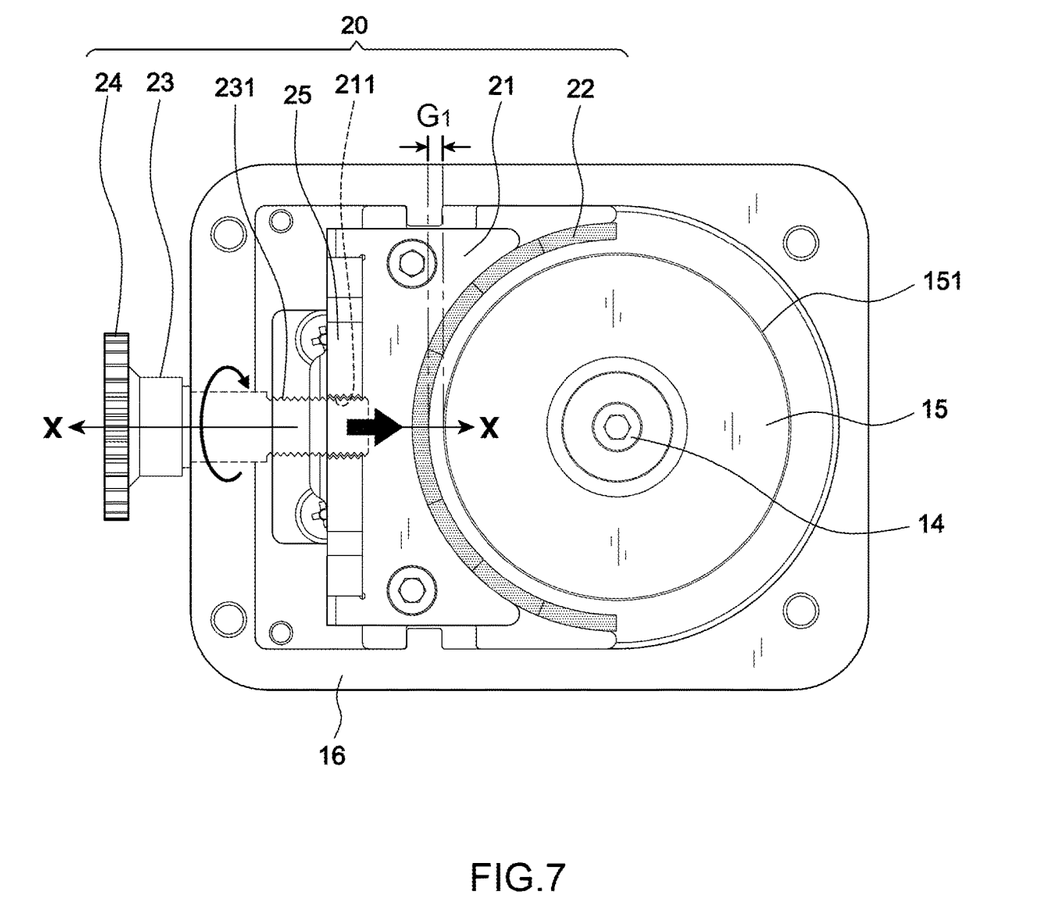
FIG. 7 is a schematic diagram illustrating displacement of the magnetic seat of the magnetic control unit.
Figure 8:
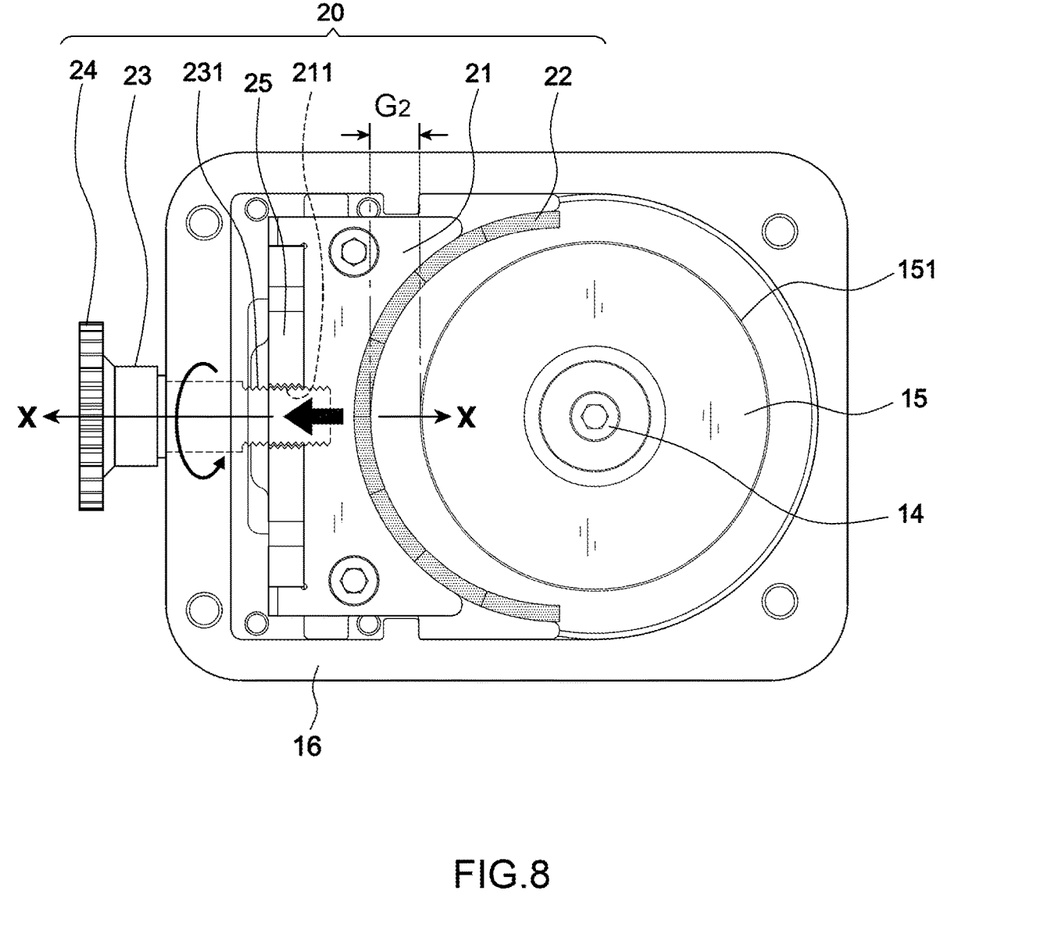
FIG. 8 is another schematic diagram illustrating the displacement of the magnetic seat of the magnetic control unit.

FIGS. 7-8 show the displacement of the fixing seat 21 of the magnetic control unit 20 in present invention; the fixing seat 21 unit having a circular permanent magnet 22 arranged near to the rotor 15 and the magnetic ring 151; the fixing seat 21 having a shaft hole 211 arranged at the outer edge of a nut 25, a rotation shaft 23 screwed with the nut 25, and the rotation shaft 23 extended through out of the first case 16 and connected to a driven gear 24, the driven gear 24 drive the rotation shaft 23 to rotate, and the nut 25 force the fixing seat 21 to displace linearly; the displacement of the fixing seat 21 changes the gap between the permanent magnet 22 and the magnetic ring 151 wherein FIG. 7 shows the status when the fixing seat 21 displaces closest to the rotor 15, in this status, between the permanent magnet 22 and the magnetic ring 151 form a minimum gap G1, and the minimum gap G1 creates maximum magnetic flux density which brings the biggest sport damper; FIG. 8 shows the status when the fixing seat 21 displaces farthest from the rotor 15, in this status, between the permanent magnet 22 and the magnetic ring 151 form a maximum gap G2, and the maximum gap G2 creates minimum magnetic flux density which brings the smallest sport damper.

Figure 9:
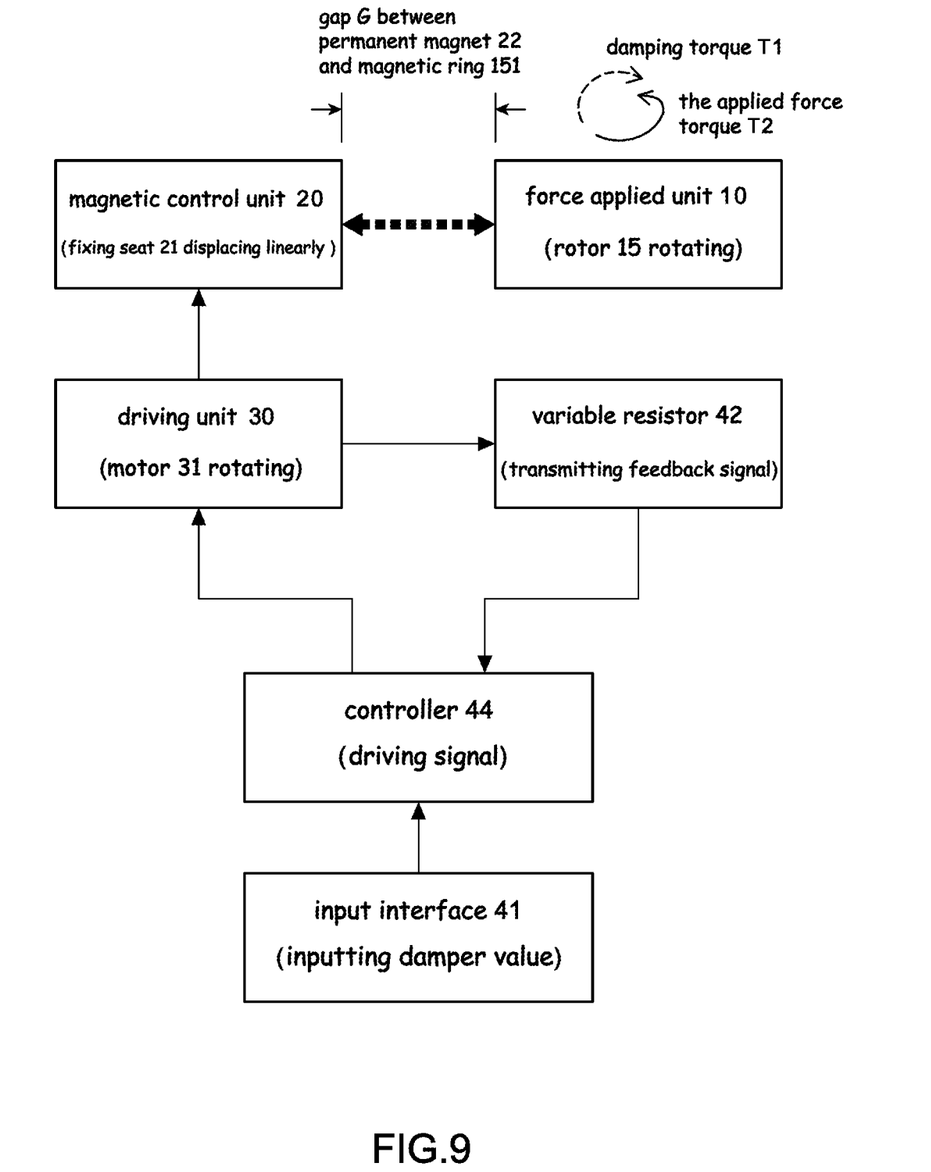
FIG. 9 is the operating block diagram of the control unit in the present invention.

FIG. 9 is the operating block diagram of the control unit 40 in the present invention; the user inputs the required damper value by input interface 41, the controller 44 calculates the gap between the permanent magnet 22 and the magnetic ring 151 with reference of the damping value, and according to the calculation of the parameter value of the rotation of the motor 31 of the driving unit 30 and giving an instruction of operating, then the motor 31 rotatation transmits to the second transmitting gear 342 via the gear train 34 driving the driven gear 24 and forcing the fixing seat 21 of the magnetic control unit 20 displace linearly, and transmits to the third transmitting gear 343 driving the input shaft 43 rotated making the variable resistor 42 transmit a feedback signal of displacement to the controller 44, the controller 44 further estimates the off-set value for the motor 31 rotation, repetition of these calculations gets the required gap G between the permanent magnet 22 and the magnetic ring 151, the required gap G produces an eddy load which turns to be damping torque T1, the applied force torque T2 is the force user applied to the force applied unit 10 to drive the driving rod 12 to displace linearly and drives the rotor 15 to rotate; since the applied force torque T2 must be larger than the damping torque T1 to drive the driving rod 12 and the rotor 15 to rotate, the damper in the present invention achieves providing effects of fitness exercise.

Since the linear displacement of the driving rod 12 drives the magnetic ring 151 operated a circular rotation motion, and the motor 31 drives the fixing seat 21 displaced linearly, then produces a gap between the permanent magnet 22 and the magnetic ring 151, and the eddy load produced by the gap becomes the damper to the rotor 15 and the driving rod 12 during linear displacement; a magnetic resistance from the eddy load produced between the permanent magnets and the magnetic surface, solving the problem of oil leakage and the problem of slow reaction in a conventional hydraulic cylinder, also, the present invention uses the motor 31 to drive the fixing seat 21 to displace, the user does not need to adjust the damper manually, so having the benefits of automation and strength saving. Moreover, the control unit 40 of the present invention including an input interface 41 for user to set a damper value in required, a variable resistor 42 driven by a motor 31, a controller 44 received the feedback signal and estimate the motor 31 parameter values, then the motor 31 drives the fixing seat 21 displaced, producing a required gap G between the permanent magnet 22 and the magnetic ring 151, and the eddy load produced by the gap G becomes the damper to the axial force applied to the force applied unit 10, the present invention adjusts the required gap G by the control unit 40 controlling the displacement of the fixing seat 21, then achieve the effect of precisely control the damper value.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An electric adjustable magnetic control damper, comprising:
a force applied unit having a tube body, at the inner periphery of the tube body having a first axial passage and having a first through hole at the end; a driving rod set through the first axial passage and extended through out of the first through hole, the driving rod having a first pivot portion at the end; a screw sleeve engaging the inner end of the driving rod for linear displacement in the first axial passage; a screw rod including a shaft section and a thread section to be screwed with the screw sleeve, and the screw sleeve for the screw sleeve to displace linearly and for the screw rod to be rotatable; a rotor arranged at the shaft section having a magnetic ring at the outer periphery; a first case having a first container for placing the rotor, a bottom lid for fixing the tube body, and a top lid for connecting second pivot portion;

a magnetic control unit having a fixing seat arranged inside the first container, the fixing seat unit having a circular permanent magnet arranged near to the rotor and the magnetic ring to form a gap and create eddy load; the fixing seat having a shaft hole arranged at the outer edge of a nut, a rotation shaft having a thread section to be screwed with the nut, and the rotation shaft extended through out of the first case and connected to a driven gear, the driven gears drive the rotor to rotate, and the nut force the fixing seat to displace linearly;

a driving unit having a motor and a gear train; a second case having a second container for installing the motor, a gear chamber for installing the gear train; the driven gear of the magnetic control unit engaging the gear train for driving the rotor of the magnetic control to rotate;

a control unit arranged at the side of the second case having an input interface for setting a damper value, and a controller drives the motor to rotate with the damper value been set;

whereby the driving rod displaces linearly in the first passage when the force applied unit is subject to an axial force, driving the screw sleeve to rotate the screw rod and further driving the rotor and the magnetic ring operating a circular rotation motion; the control unit drives the motor of the driving unit by the damper value been set, by the connection with the driven gear the gear train drives the rotation shaft to rotate and make the fixing seat of the magnetic control unit displaces linearly, then produce a required gap between the permanent magnet and the magnetic ring, and the eddy load produced by the gap becomes the damper to the axial force applied to the force applied unit.

2. The electric adjustable magnetic control damper as claimed in claim 1, wherein the control unit having a variable resistor arranged inside the second container, the variable resistor having an input shaft connected to the gear train, the input shaft is droved by the motor to rotate and transmits signal of the displacement back to the controller.

3. The electric adjustable magnetic control damper as claimed in claim 2, wherein the permanent magnets are composed of a plurality of rubidium magnets.

4. The electric adjustable magnetic control damper as claimed in claim 2, wherein the magnetic ring is composed of a ring formed magnetic component fixed at the periphery of the rotor.

5. The electric adjustable magnetic control damper as claimed in claim 2, the first pivot portion is composed of an oil-bearing or a tube.

6. The electric adjustable magnetic control damper as claimed in claim 2, the second pivot portion is composed of an oil-bearing or a tube.

* * * * *